Patented Feb. 20, 1934

1,947,949

UNITED STATES PATENT OFFICE 1,947,949

PROCESS FOR PRODUCING RUBBER POOR IN ALBUMEN

Hermann Miedel, Frankfort-on-the-Main, Germany, assignor to Revertex Limited, London, England, a corporation of England No Drawing. Application January 30, 1931, Serial No. 512,493, and in Germany February 11, 1930

3 Claims. (Cl. 18—50)

This invention relates to a process for producing rubber poor in albumen.

It has already been proposed to remove albumen from rubber latices and to obtain therefrom pure rubber hydrocarbon by treating said latices with dilute alkali solution and allowing it to cream, and if necessary, repeating this operation several times and finally removing the alkali for example, by dialysis. A process for removing albumen from rubber latex has also been proposed which comprises treating the latex with water at elevated temperatures in pressure vessels.

It has now been found that the albumen content of rubber latex can be reduced to a sufficient extent to render it suitable for the production, for example, of submarine cables by subjecting said latex to the action of dilute alkali solutions containing less than 10% of alkali at temperatures below the boiling point of the liquid under ordinary pressure, for example, at temperatures of from 50 to 100° C. and preferably from 90 to 100° C. By this means the employment of complicated operations, such as creaming and dialysis as well as the use of cumbersome pressure apparatus is dispensed with.

In carrying out the invention it is merely necessary to heat the latex for some hours, for example, 1 to 10 hours and preferably 3 to 10 hours with the alkali at ordinary pressure in order to obtain a substantial decomposition of the albumens. Rubber having a very low albumen content can be obtained from latex thus treated by coagulation and washing out the coagulant. In order to facilitate the washing out of the rubber coagulant it is advantageous to employ coagulating agents which yield finely flocculent coagula. Zinc salts have, in this respect, proved most suitable.

Example

Sodium hydroxide solution is added to 35% preserved latex in such quantity that the mixture contains 3% NaOH calculated on the rubber content. Thereupon the latex is heated for 7 hours to a temperature of from 90 to 100° C. by passing in steam. After cooling, the liquid is diluted until its rubber content is reduced to about 5% and thereupon 30 parts of 1% $ZnCl_2$ solution are added to 100 parts of this liquid. A finely flocculated precipitate is thrown down which balls together on warming to form a loose coherent mass. By drawing off the water and adding fresh water and repeating this operation several times the coagulum is washed out and thereupon creped and dried. The finished product has a nitrogen content of less than 0.05%. As a rule, the nitrogen content of the rubber obtained in the foregoing manner lies between about 0.02 and 0.04%.

The rubber obtained in accordance with the present invention can be employed in its vulcanized, or unvulcanized state as an electrical insulating material, for example, for submarine cables.

I claim:—

1. Process for the production of rubber poor in albumen and suitable for electrical insulation material, especially for submarine cables, from rubber latex, which consists of the steps of heating the latex for from 3 to 10 hours at a temperature between 50° and 100° C. at ordinary pressure with alkali in an amount sufficient to impart to the heated mixture an alkalinity equivalent to less than 10% caustic soda, diluting the so-heated mixture with water in amount sufficient to reduce the rubber content of the diluted mixture to about 5%, commingling with the so-treated mixture a coagulating agent adapted to precipitate rubber in the form of a finely flocculent precipitate, separating the resulting precipitate and washing the latter.

2. Process as defined in claim 1, characterized in that the coagulating agent is a soluble salt of zinc.

3. A process for the production of rubber poor in albumen and suitable for electrical insulation material, especially for submarine cables, from rubber latices, which consists of the following steps: heating the latices with dilute alkali, for at least one hour, at temperatures below the boiling point, at ordinary pressure, diluting the reaction mixture so as to reduce the rubber content thereof to about 5%, precipitating the rubber from the resulting liquid system, and separating and washing the precipitated rubber.

HERMANN MIEDEL.